United States Patent Office 3,150,064
Patented Sept. 22, 1964

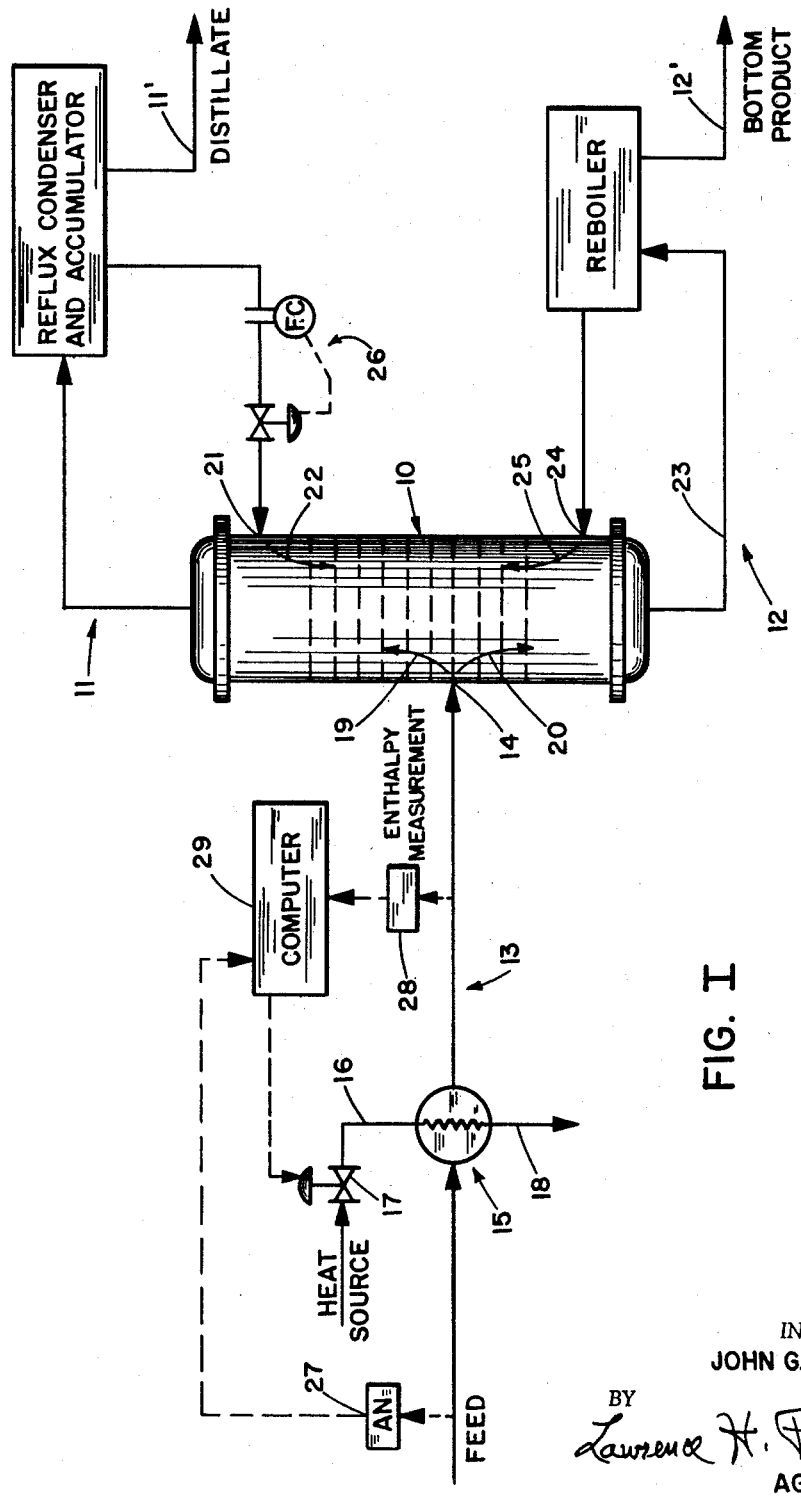
FIG. I
INVENTOR.
JOHN G. DOBSON
BY
Lawrence H. Polton
AGENT

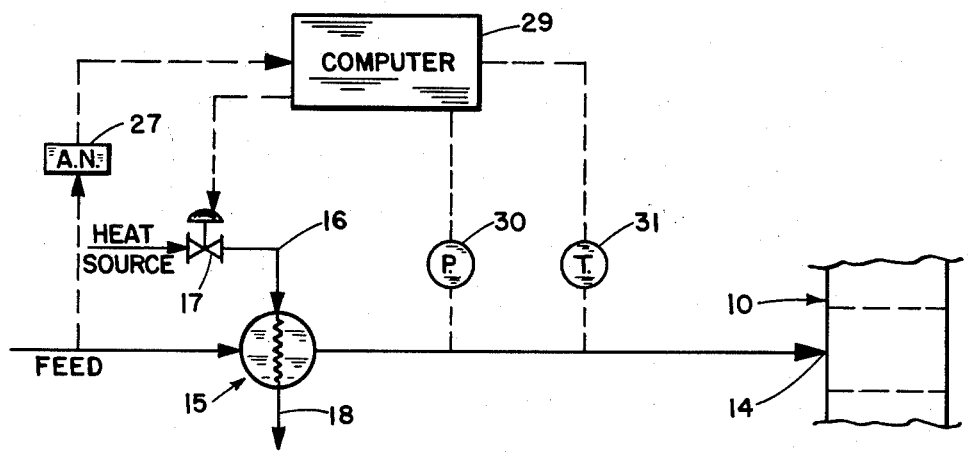
FIG. II
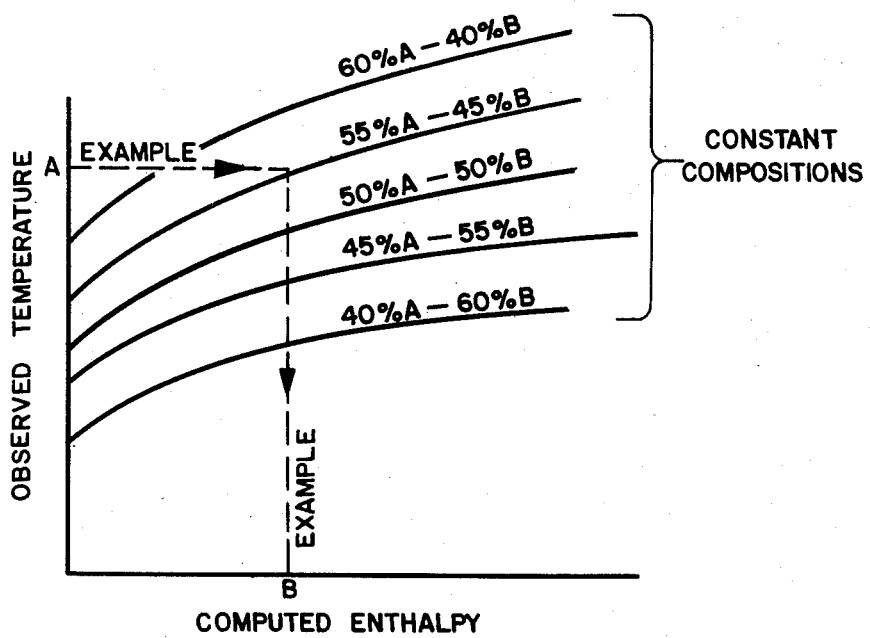
FIG. III

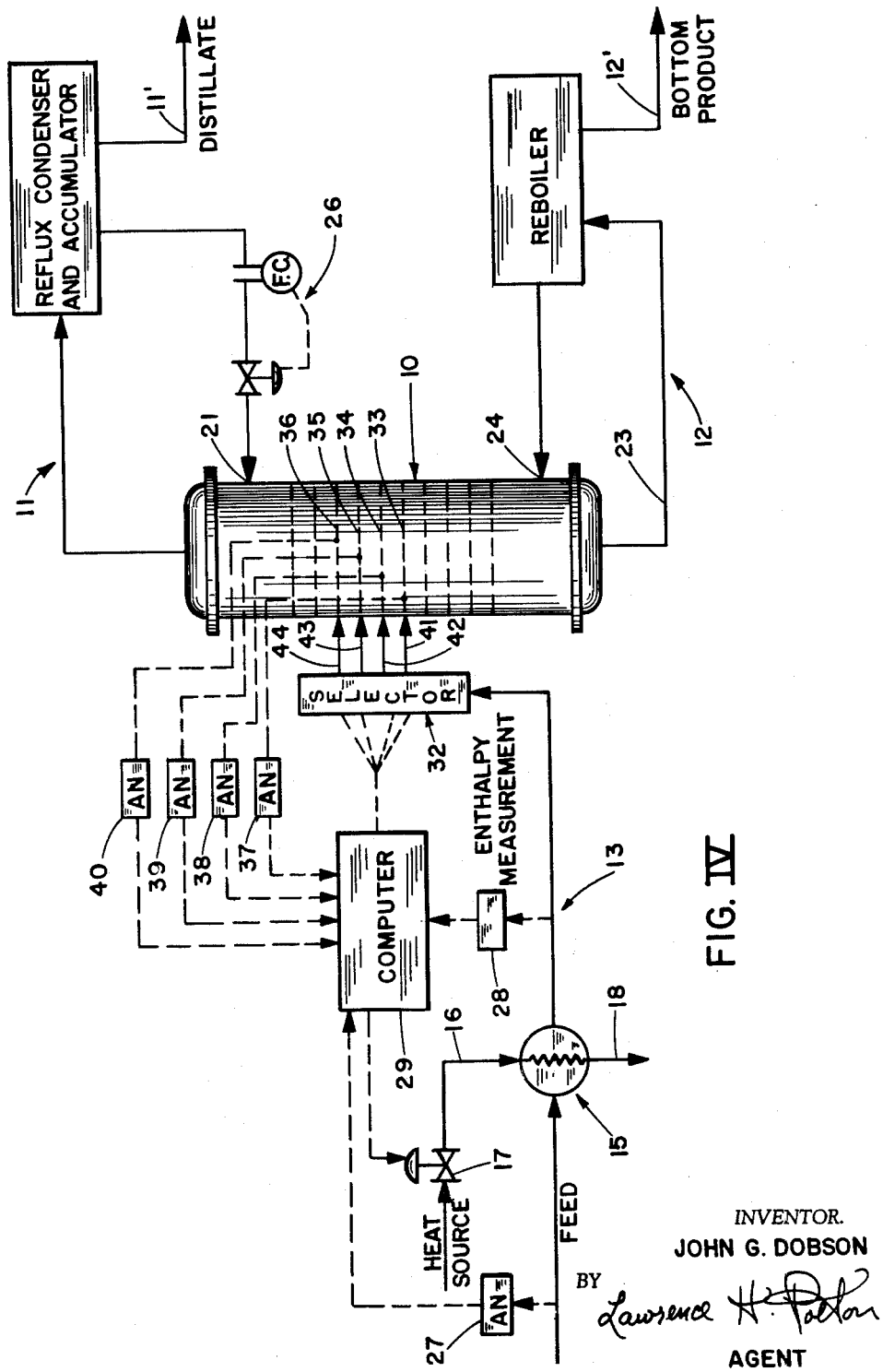

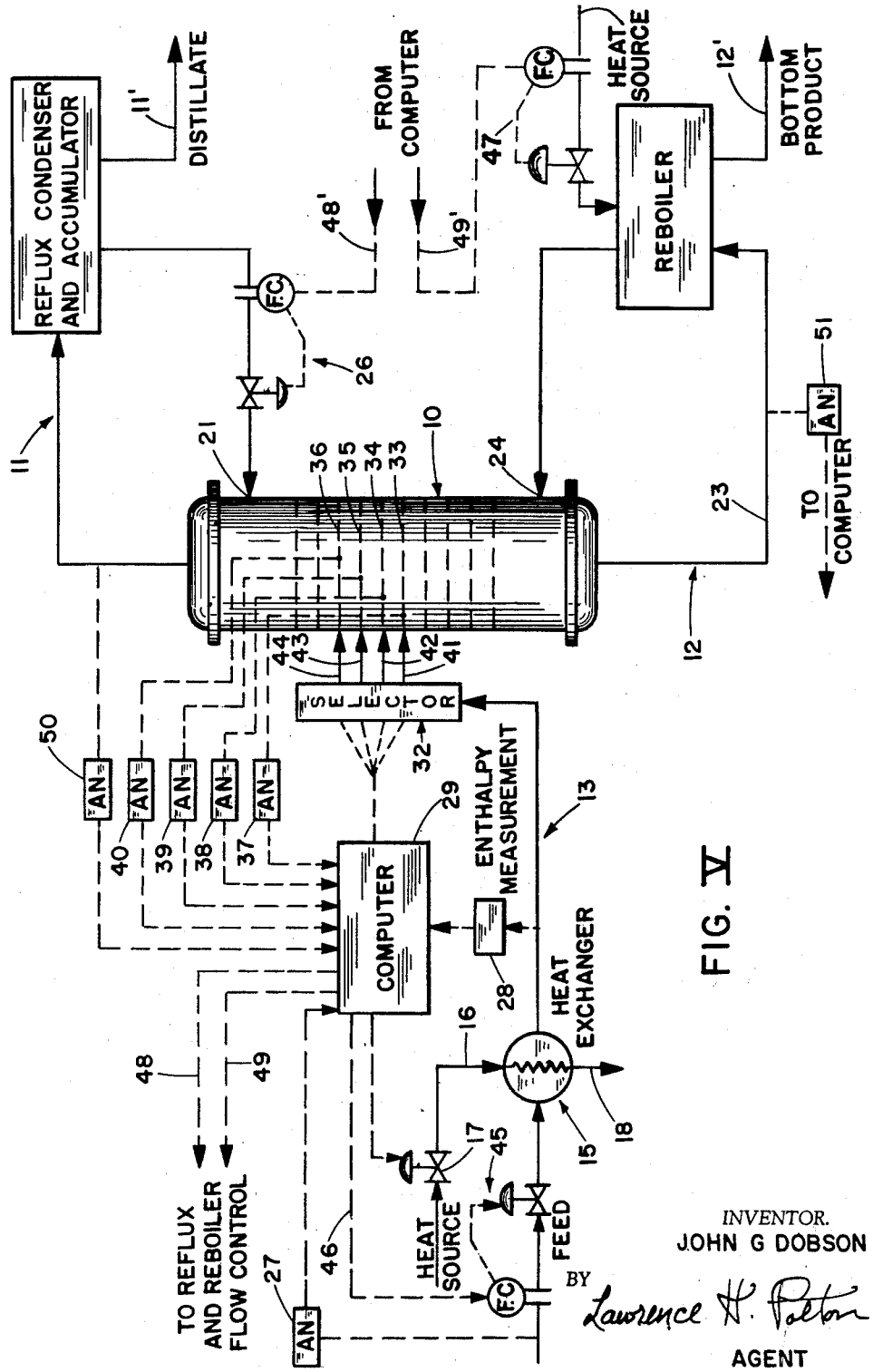
FIG. V
INVENTOR.
JOHN G DOBSON
BY
Lawrence H. Patton
AGENT

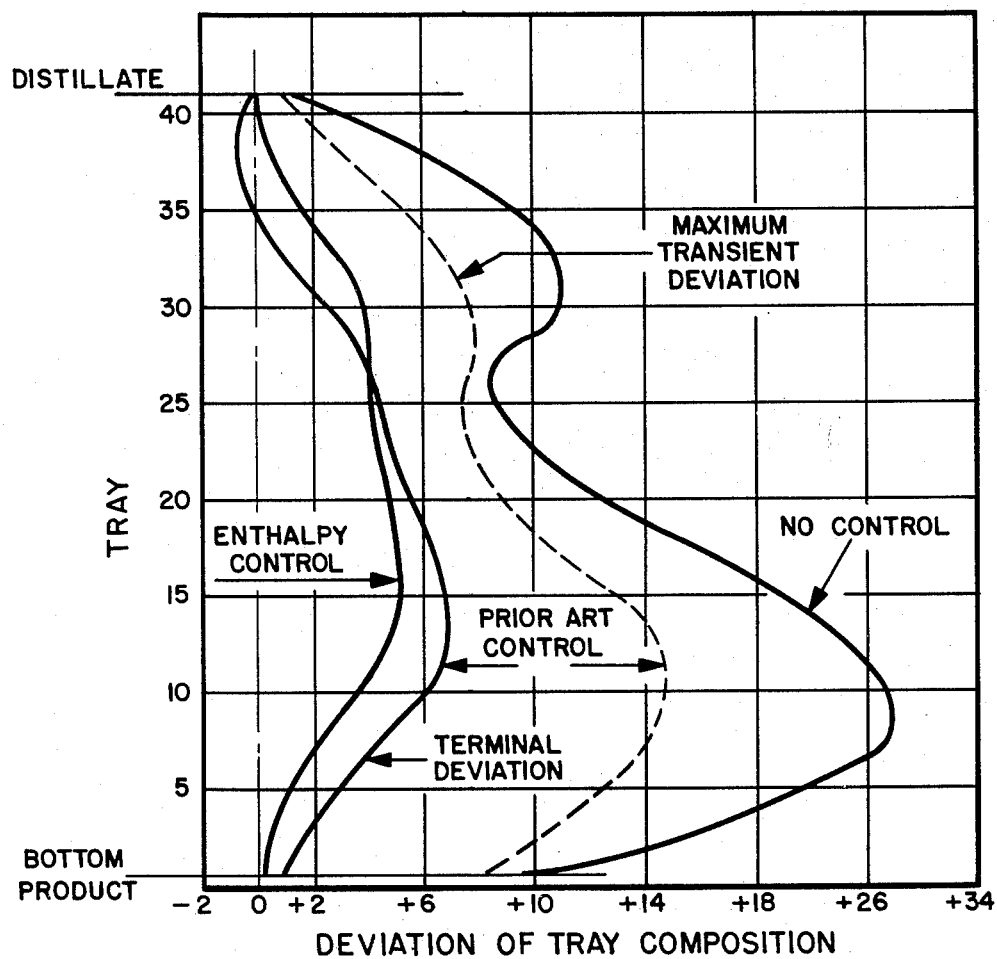
FIG. VI

3,150,064
FRACTIONATION CONTROL SYSTEM
John G. Dobson, Dedham, Mass., assignor to The Foxboro Company, Foxboro, Mass., a corporation of Massachusetts
Filed Aug. 8, 1960, Ser. No. 48,015
8 Claims. (Cl. 202—206)

This invention relates to mixtures of chemicals and means for separating such mixtures into their components or into combinations of their components.

This invention particularly relates to fractionation and control systems therefor.

As an example of the application of this invention in a column separating a binary mixture, a fractionation column may be provided with a series of horizontal trays, a top product (distillate) and reflux arrangement, a bottom product and reboiler arrangement, and feed means for supplying the mixture of chemicals to be separated into a selected, intermediate tray. In the concept of this invention, the feed is applied to the column in a condition of controlled enthalpy as a liquid-vapor combination, or as a liquid at a temperature below its boiling temperature at column pressure. This invention is applicable, as well, to multiple component columns, and to columns with various tray designs, and packed columns.

In the column, vapor rises and liquid falls, and through reflux, reboiler, and tray situations, interaction between the liquid and vapor results in separation of the components of the mixture of chemicals into distillate and bottom product.

A column is usually established to a steady state of operation with respect to possible variables such as heat, flow, reflux, reboiler, product take-off, pressure, and feed.

The composition of the feed is usually an uncontrolled variable and one which is capable of upsetting the column operating situation for considerable periods of time. Such upsets involve undesirably impure products and considerable expense.

In control situations, feed-back arrangements are commonly used, and they involve a measurement downstream of the control action. Less commonly understood are feed-forward arrangements. These involve a measurement upstream of the control action.

In the past, automatic compensation actions for fractionation feed composition variations have usually involved only feed-back, for example, through control of reflux quantity. Feed-back involves inherent delay, and in such cases time is consumed while the upset moves through the column to a sensing unit, and then more time is consumed while the corrective action takes effect. Thus the prior art expense and impurity considerations are still undesirably present.

This invention applies feed-forward control to the fractionation feed, with minimum delay such that the upset and compensation are dynamic in the same direction, and essentially simultaneous. According to this situation, this invention may involve feed-forward control alone, or it may involve a combination of feed-forward and feed-back.

The response of the system of this invention to a feed composition upset is to vary the enthalpy of the feed as it enters the column. In most instances, this invention involves a fractionation system wherein the enthalpy of the feed is represented by the liquid-vapor ratio of the feed as an effective factor of operation and control. In other instances the enthalpy of the feed may be in terms of the temperature of liquid sub-cooled below its boiling temperature at column pressure.

Inside the column, interaction between liquid and vapor is a basic operating consideration. Thus, to maintain an operating situation in a column with minimum column upset and with desired product purity essentially maintained, a change in feed composition with consequent tendency to transient column upset may be compensated for by a change in the enthalpy of the feed, usually in terms of the vapor-liquid ratio in the feed.

In the feed situation of this invention, more or less heat is applied to the feed to establish the desired enthalpy in the feed. Then, in response to feed composition change, the heat to the feed is changed to achieve the new desired enthalpy in the feed. This action is usually a change in the liquid-vapor ratio in the feed.

The action according to this invention is to respond to a feed composition upset by adjusting the liquid-vapor situation in the column. In sub-cooled feed situations the change involves a different degree of sub-cooling of the feed, that is, a change of temperature of the feed in liquid form when the feed temperature is below the boiling point of the feed. In liquid-vapor feed situations, the change involves establishment of a new liquid-vapor ratio.

In liquid-vapor feed situations, the feed may be considered as a single total flow divided into two different flows, i.e. vapor, and liquid. Thus, within certain limits, the vapor flow may be varied (and consequently the liquid flow) without changing the total feed flow.

Therefore, this invention provides a fractionation control system which responds to a change in feed composition to provide a determination of the new composition or of a deviation from the previous composition, which computes the enthalpy for the feed with respect to a composition-tray profile in the column, consistent with the new composition, and which establishes the computed enthalpy in the feed.

There are three general situations with respect to feed enthalpy in this invention. First, for a given steady state condition, the enthalpy is brought to a desired condition and maintained. Second, in case of a slow upset of feed composition, such as might occur when the feed is supplied from a large feed storage tank, adjustment of the feed enthalpy may be made in matching slowness. As a third possibility, in case of a sharp feed composition change, the compensating feed enthalpy change may at first be substantial, and then tapered off to a new steady state. Thus, in each case, the operating effectiveness of the column is essentially undisturbed and the product purity is maintained.

This invention may involve control of feed enthalpy alone, or may in addition involve either or both feed tray selection and control of feed rate. The invention comprises response of feed conditions to measured composition of the feed alone, or may be combined with other measurements in the column, such as pressures, temperatures and flow rates whereby overall computation is performed including change of enthalpy of the feed and also other manipulated variables, to maintain a minimum change of product quality as a result of changes in composition of the feed material.

This invention provides a means of compensating for a change of feed composition without allowing a serious transient upset in the column profile.

This invention provides a means of minimizing the steady state change of column profile after a change of feed composition without requiring a change of both reflux and reboiler rates.

In the prior art, the most common method of controlling a fractionating column is as follows:

The feed is fed to the column, usually as a liquid, at a temperature or enthalpy which happens to exist in the feed storage tanks. Usually, no care is taken to control heat content of the feed being fed to the column. In some cases, control is provided to assure that the feed reaching the column is at its bubble point. In other cases, the feed is heated above its storage temperature by passing through waste-heat exchangers which are provided for the conservation of heat without regard for the particular enthalpy of the feed reaching the column.

If the overhead product or distillate is the material where composition is most critical, the usual control system provides for a constant heat to the reboiler to provide an essentially constant vapor in the stripping section of the column and a controlled rate of reflux controlled to maintain a constant composition on some tray in the rectifying section. This is usually accomplished by maintaining the pressure of the column at a fixed value, usually by bypassing hot vapors around the overhead condenser, and by controlling the temperature on a selected tray using such temperature control to operate a valve in the reflux line.

The amount of separation of components occurring between two plates on a column is a function of the amount of energy provided to those trays. The energy is provided in the form of vapor moving up through the trays and liquid moving down through the trays. For a given liquid and vapor rate moving through the trays, the less product which is produced, the more separation will occur, or conversely, if the amount of product moved through the trays is increased for a given liquid and vapor quantity being moved through the trays, the less separation will occur. If the liquid moving down through the trays is designated as L, and the vapor moving up through the trays is designated as V, the separation occurring is therefore a function of:

$$(V-L)/L \text{ or } (V-L)/V$$

in the rectifying section, or:

$$(L-V)/L \text{ or } (L-V)/V$$

in the stripping section.

The term reflux ratio has been applied to a number of ratios within a column and has therefore lost its specific meaning in column technology. For this reason, the term SEVERITY is applied to the ratios noted above.

For a given reboiler heat, a given reflux, and a given feed composition and quantity under stable operating conditions, a fixed profile of tray composition and tray temperatures will develop in the column. Such a profile will be referred to in later discussions as the Reference Profile.

In a prior art control system with a temperature controller in a tray near the overhead controlling the reflux to the tower, if the composition of the feed material is changed, and the reflux rate is changed in order to provide for a fixed distillate composition, then an entire new profile will be established in the column which will be substantially different from the reference profile. It is possible, viewed on a stratic basis, to return the profile of the column after the change of feed composition to a value quite close, although not equal, to the reference profile by changing the reboiler heat as well as the reflux rate. However, this is an operation which requires extensive computations and which is normally beyond the skill of the operator of distillation plants. In normal commercial practice, no step is taken to restore the reference profile upon a change of feed composition.

In a fractionating column, when a change is made in the composition of the feed material to the column, the composition of the feed tray does not immediately achieve a new value, but its composition begins to modify at a rate which is a function of the relative amount of material on the tray and the amount of feed material.

For trays further removed from the feed tray, when a change occurs in feed composition, the change on some other tray does not begin to occur until some finite later time generally called dead time. When the change does begin, the rate of change is slower than the rate of change of the feed composition.

The type of response occurring on trays is typical of the response of any system which is characterized by a material transportation lag plus a series of resistance-capacitive networks.

The length of dead time is a function of the number of fractionating trays which are interposed between the feed tray and the tray upon which the measurement is being taken. The rate of response to such changes is also, among other variables, a function of the number of trays between the feed tray and the tray upon which the measurement is being taken; and a function of the ratio of the tray liquid hold-up to liquid feed. One frequently applied method of measuring such delays is known as the frequency response method and tests reported by Rijnsdorp and Maarleveld" (Use of Electrical Analogs in the Study of the Dynamic Behaviour and Control of Distillation Columns," by J. E. Rinjsdorp and A. Maarleveld, Inst. of Chem. Engrs., Joint Symposium on Instrumentation and Computation in Process Development and Plant Design, May 1–13, 1959) have shown the response of a column under such test conditions.

Essentially, the frequency response method determines the reduction in the amplitude of the tray composition response and the shift in the phase of a tray composition response to sinusoidal changes occurring in the feed composition at various sinusoidal frequencies of variation. The authors reported that on a 32-plate column, the feed tray had an amplitude ratio of 1 at a frequency of $10^{-2}$ cycles/second and under these circumstances had a phase shift of less than 45°. However measurements taken 12 trays below and 12 trays above the feed tray had an amplitude ratio of less than .01 at this same frequency, and had a phase shift in excess of 360°. Thus a substantial resistance capacity network lag exists between changes of tray composition at the feed tray and changes of tray composition on trays a distance from the feed tray.

The time for such transient changes to reach a steady state condition after a step upset will vary from a few minutes to 50–60 days depending on the ratio of hold up to liquid and vapor rates within the column, the value of alpha (or the separation factor) of the material being separated and other factors.

In a conventional control system, a change in feed composition has no effect on the control system until the change is reflected in changes on a tray which is selected for the quality control. Such quality control may be achieved by maintaining a given temperature on a tray or by maintaining a given temperature difference between two selected trays in the column; assuming that the column is under pressure control. After such a change of feed composition is detected, a conventional control system will modify the reflux liquid to the column or will modify the reboiler heat to the column in order to reestablish the desired quality.

If such temperature maintainance is at the top tray, or near the top tray, the composition on such tray is reasonably reflective of the composition of the distillate, but the control system associated with it takes no corrective action due to changes of feed composition until after the transient delay of the column referred to above. Such a system will respond fairly promptly to changes of reflux, since the reflux is being added close to the quality control.

If, on the other hand, the quality control tray or trays are selected further down in the column, to minimize the transient delay of response due to changes of feed composition, the transient delay of response due to changes of reflux flow are substantially increased, and no improvement in the overall dynamic response of the system to changes of feed composition is achieved.

By placing the quality control on a tray substantially removed from the overhead tray, an additional problem is introduced since the column profile for a fixed overhead composition is such that a greater difference exists between the final profile with change composition and the reference profile at a point substantially removed from the overhead tray than the difference which exists between the new profile and the reference profile at a tray close to the overhead tray.

This invention overcomes the transient delays in the column which are caused by having the upsetting condition of change of feed composition introduced into the column at a substantially different point than a correcting means such as reflux variation. By having the correcting means introduced at the same point as the changes of feed composition as by changing the enthalpy of the feed, the dynamic response of the control system is substantially improved and the transient deviation both in profile and in overhead and bottom composition is minimized.

The control system according to this invention also provides on a static basis, a composition profile after a change in feed composition more closely approximating the reference profile than is achieved when the overhead composition is controlled by changes of reflux rate. The result of this control system on the column profile after a change of feed composition is the same as can be achieved by changing both reflux and reboiler rates at optimum values, but this system provides means of determining those optimum values without extensive column calculations, and also maintains these optimum column profiles during transient changes, which is impractical when the correction factors are the reflux and reboiler rates.

This invention may be applied either to close control of distillate, or close control of bottom product.

It is therefore the object of this invention to provide a new and useful fractionation control system.

Other objects and advantages of this invention will be in part apparent and in part pointed out hereinafter, and in the accompanying drawings, wherein:

FIGURE I is a schematic illustration of a fractionation control system wherein feed composition upset is compensated for in terms of feed enthalpy;

FIGURE II is a schematic illustration of one form of fractionation feed control according to this invention;

FIGURE III is a graphic illustration of feed enthalpy computation through the system of FIGURE II;

FIGURE IV is a schematic illustration of a combination system according to this invention, wherein feed tray selection and feed enthalpy may be combined;

FIGURE V is a schematic illustration of a combination system according to this invention, wherein feed tray selection, feed enthalpy, feed flow, and other associated factors may be combined; and FIGURE VI is a graphic illustration of control of column tray composition deviation according to this invention.

The FIGURE I showing in the drawings comprises generally a fractionation column 10 having a reflux arrangement 11 in the top portion thereof, a reboiler arrangement 12 in the bottom portion thereof, and a feed arrangement 13 wherein the column is supplied with new material at an intermediate point or tray 14 taken vertically of the column.

Thus in the operation of the column according to this invention, feed material is supplied through the feed arrangement 13 to the column feed tray 14, with this feed established at a particular enthalpy, that is, liquid-vapor ratio, or temperature of the feed below the boiling point at feed tray pressure. This enthalpy situation of the feed is established by a heat exchanger 15 through which the feed passes and which may be in the form of a steam line 16 with a control valve 17 and a condensate disposal outlet 18.

As the feed material reaches the column feed tray 14 the vapor portion of the feed flows upwardly as at 19 and the liquid portion of the feed flows downwardly as at 20. This is a tray form of a fractionation column and the components of the feed material are considered here as a binary mixture with a major portion of one component taken off at the top through the reflux arrangement 11 and a major portion of the other component taken off at the bottom through the reboiler arrangement 12. In the course of the operation of the column the vapor reaching the top of the column is condensed in the reflux arrangement 11 and part of this condensate is reentered at the top of the column as at 21 to flow down through the column in liquid form as at 22.

Similarly the liquid reaching the bottom of the column is partially taken off as bottom product through outlet 23 and partially reheated and revaporized and reentered in the column as at 24 to rise thorugh the column as indicated at 25.

In the top arrangement, through the reflux arrangement 11, a top product (distillate) is taken off through an outlet 11'. The reflux arrangement is provided with a flow control system 26. In the bottom arrangement, through the reboiler arrangement 12, a bottom product is taken off through at outlet 12'.

Thus in the column there is a system of rising vapor and falling liquid both from the feed input and from the reflux and reboiler systems, with this liquid and vapor interacting in rectifying and stripping actions above and below the feed tray. The reflux and reboiler arrangements also may be provided with other usual controls (not shown) as to flow, pressure and the like.

There are gradients in the column, such as a composition gradient varying from top product purity down to bottom product purity, and a temperature gradient varying from the maximum reboiler heat at the bottom of the column and decreasing up through the column at the various trays. Each of these situations are profiles and may be used as guides in maintaining a desired operation situation in the column.

It is desired to maintain a particular top product purity and bottom product purity. Either the top or the bottom product is selected for the greatest control and to some extent the non-selected product varies, but within operating limits.

The upsetting condition with which we are concerned is a variation in the feed material composition which is ordinarily uncontrolled.

The feed arrangement 13 includes a dynamic control system including feed forward control. The composition of the feed is determined by an analyzer 27, upstream of the heat exchanger 15. The analyzer may be chromatographic or in other suitable form. The enthalpy of the feed is determined by a measurement downstream of the heat exchanger 15, as at 28. These measurements are applied to a suitable commercially available computer 29. The computer is used to determine a suitable new enthalpy value for the feed in view of the feed composition and as related to a desired operating situation in the column. In accordance with such determination, the computer 29 provides a suitable output signal for operating the heat exchanger valve 17 in the steam line 16. Thus, more or less heat is applied to the feed, and feed composition upsets are compensated for essentially wholly prior to the entrance of the feed to the column. Further, as far as the column is concerned the feed composition upset and its compensation, occurs at the same point i.e. the feed tray, for example, at 14.

Thus the feed is analyzed and the required enthalpy for the feed is computed from this analysis. The computed enthalpy is established by feed back control using the set point computed from the feed analysis.

FIGURES II and III relate to a specific example of the control system indicated in FIGURE I and illustrate one of a number of possible methods of measurement of the enthalpy in the feed. With respect to FIGURE I, in FIGURE II, like reference numerals have been applied to like components. FIGURE II shows specifically, downstream of the heat exchanger 15, a pressure measurement 30 and a temperature measurement 31. In the case where the feed material is at a temperature below the boiling point of the feed material at the pressure in the feed tray, the enthalpy may be computed from a knowledge of the composition of the material and its temperature. This computation involves well-known applications of physical chemical principles involving the enthalpy above a known datum on the basis of temperature and specific heat of known components.

In the case where the feed material is partly liquid and partly vapor, the enthalpy may be computed from a knowledge of the composition of the material, the pressure which exists in the line and the temperature of the material.

FIGURE III sets forth typical data which is available for known components in which the enthalpy of a mixture can be related to observed temperature and known composition at a fixed pressure. Similar data can be applied at any other pressure and the program of the computer would contain such data to permit the computation of the enthalpy in this manner.

In the systems shown in FIGURES I and II, the desired enthalpy of the feed may be computed on the basis of the composition determined by the analyzer and the existing enthalpy may be computed from the data noted above. The comparison of the desirable enthalpy with the existing enthalpy permits feedback control which may be used to modify the valve position, increasing or reducing the amount of heat to the heat exchanger. The computation of the optimum enthalpy of feed for a given feed composition may involve a tray-to-tray computation of the composition in the column similar to a number of available computing programs such as the Bonner Program, available for IBM-650 digital computers, and a knowledge of the desirable material balance or distillate yield in the column.

It is well-known that if a column is operating to separate component A from component B, and if component A is the more volatile being taken from the column as distillate, and component B is the less volatile material which is being taken from the column as a bottom product; if the feed composition increases in the quantity of A available in it, then the amount of distillate being removed from the column must be increased. In the prior art situations, this increase of product removed from the overhead of the column has been achieved by decreasing the amount of reflux being returned to the column. In this invention, the amount of product being taken as distillate off the overhead of the column is increased by increasing the vapor flow in the column, which in turn, is achieved by increasing the amount of vapor in the feed or by increasing the enthalpy of the feed.

In the case where the liquid is being fed to the column below the boiling point, the required increase in vapor rate in the column to compensate for increase of the concentration of A in the feed composition is achieved by increasing the enthalpy of the feed.

If the feed has been to the column substantially below its boiling point, the feed on the feed tray has been condensing some of the vapor which has been originating at the reboiler and returning it to the stripping section of the column as liquid.

As the enthalpy of the feed is increased, the amount of vapor thus condensed is reduced. Therefore, the vapor reaching the rectifying section of the column and reaching the overhead is increased. In this way, the proper amount of distillate yield is achieved consistent with the composition of the feed.

The effect on distillate yield of a column of changes in the enthalpy of the feed may be further explained as follows:

Considering a material balance around the top of the column: The distillate yield equals, assuming no storage, the value of the vapor moving up in the column less the value of the liquid moving down in the column. Similarly, the bottom product yield equals the amount of liquid moving down in the stripping section minus the amount of the vapor moving up in the stripping section. It is therefore clear that anything that affects either the liquid or vapor rates in either the rectifying or the stripping section, will effect the value of distillate and bottom yield. If a material balance is done around the feed tray, assuming that the feed is partly liquid and partly vapor, the vapor rate in the rectifying section equals the vapor in the stripping section plus the amount of vapor in the feed. Similarly, the liquid in the stripping section equals the liquid in the rectifying section plus the amount of liquid in the feed. In the case where the feed is entering the column in a sub-cooled condition (that is, where the liquid feed is below the boiling point of that material at column pressure), similar material balance about the feed tray may be done. In this case, the vapor rate in the rectifying section is equal to the vapor rate in the stripping section less the amount of vapor required to bring the feed from its existing temperature to its bubble point and the liquid rate in the stripping section is equal to the liquid rate in the rectifying section plus the quantity of feed, plus the amount of vapor condensed in the feed tray to bring the feed to the bubble point. From this, it is clear that the column may be operated with the rate of reflux liquid equal to the rate of reboiler vapor and with the feed varying from 0–100% vapor. Under these conditions, with the feed 100% liquid, all of the product will be taken out of the bottom of the column and no distillate will be made. When the feed is all vapor, all of the product will be taken out of the top as distillate and no bottom product will be made. Thus, by varying the liquid-vapor ratio in the feed material, the rate of distillate and bottom produce may be varied from 0–100% of the feed. This change is essentially independent of the severity of operation of a column.

The FIGURE IV illustration of the system according to this invention is based on the FIGURE 1 illustration and like reference numerals have been applied to like elements therein.

In addition to the system and action of the FIGURE I situation, the FIGURE IV system provides a selector unit 32 through which the feed in the system 13 may be applied to any one of a selected series of column trays as at 33, 34, 35 and 36.

It is well-known in the prior art, that the ability of a fractionating column to separate components is decreased, for a given severity of operation, if the composition of the feed plate does not equal the composition of the feed.

In the case of the control of distillate yield in the column by controlling the enthalpy of the feed in accordance with this invention, maintenance of reasonably constant profiles is important and for that reason, when wide variations of feed composition are occurring, it is advisable in the practice of this invention to assure that the composition of the feed tray is substantially equal to the composition of the feed. In FIGURE IV, the composition of the various possible feed trays, 33, 34, 35, and 36, is determined by a group of analyzers 37, 38, 39, and 40. In actual practice, this might well be a single analyzer which would be programmed to sample the chemical analysis on each tray in sequence or it might consist of a temperature measuring point on each tray assuming the column is under satisfactory pressure control. The information with regard to the composition on each tray or some measurement which is a function of such composition is fed to the computer which compares the composition on the various trays with the composition of the feed as determined by analyzer 27. The signal from the computer would then operate through selector 32 to admit the feed to the proper tray through the pipeline 41, 42, 43, or 44 which is related to the selected tray. In this way, the feed of proper enthalpy will be placed upon the tray whose composition most closely approximates the composition of the feed.

Accordingly, the overall system of FIGURE IV provides means for establishing a combination compensation for feed upset involving tray selection and enthalpy adjustment according to the need.

The system illustrated in FIGURE V according to this invention is founded on the systems of FIGURES I and IV and again like reference numerals have been applied to like elements in FIGURE V with respect to FIGURES I and IV.

In addition to the overall system of FIGURE IV, the FIGURE V system involves flow control of the feed through a flow control unit 45, which may be operated by signals from the computer 29 as indicated by dotted line 46. Thus in some combinations of compensation for feed composition upsets, there may be a new combination of input tray feed enthalpy and feed flow.

With respect to the adjustment of the feed flow through the unit 45 it is sometimes necessary to make further adjustments in the column arrangement, as for example, through the reflux and the reboiler systems by way of flow control units 26 and 47. From the computer, signals to control reflux flow and reboiler heat may be applied to the reflux and reboiler flow controllers for this purpose, as indicated by dotted lines 48 and 49 at the left of the drawing with control signals indicated as being applied to the reflux and reboiler flow controllers at the right of the drawing, through dotted lines 48′ and 49′. Measurements of composition of the distillate are made by means of an analyzer 50 and measurement of the composition of the bottom product are made by means of an analyzer 51.

A further possibility of control is means for analyzing the composition of the reflux and/or the reboiler conditions as indicated by analyzers 50 and 51 respectively with their output applied to the computer as a further step in the achievement of a more precise computation of the overall system with respect to the necessary changes in response to an upset in the feed composition.

In forward control systems, errors which occur in any of the measurements or in any of the control-elements remain uncompensated and therefore, a slight error may occur in the final results of such a feed-forward system. In order to compensate for these errors or to compensate for changes in the physical condition of the operating column, an overall feedback control trimming system is useful.

If for instance, the purity of the overhead product were the more critical measurement in the column, analyzer 50 might be used to vary slightly or trim the set point on the enthalpy controller controlling the enthalpy of the feed. If on the other hand, the bottom product were the more critical of the products, analyzer 51 might be used to measure that composition of the bottom product and in turn, provide information to compute a slightly modified or trimmed value to which the enthalpy control on the feed material would be held.

Also, in some cases where the optimum operation of a column for the particular purpose intended requires a balance between the composition of the distillate and the composition of the bottom product, analyzers 50 and 51 might both be used for providing information to the computer to make the computation of the optimization of the column under these circumstances.

In practice, analyzers 50 and 51 might well be additional sequential sampling points on the analyzer which is being used to measure the chemical analysis at points 37, 38, 39, 40 and in some cases, even the feed composition, at 27.

As previously mentioned the change of feed enthalpy in the column will modify the vapor rates in the rectifying section and the liquid rates in the stripping section of the column.

Since the severity and product yield of the column are both functions of these variables, such modification of the liquid rate in the stripping section and vapor rate in the rectifying section will also modify the severity of the column. In most cases, the small variation of these rates which is required to take care of some changes of composition of the feed will not materially affect the overall severity of the column. This is particularly true in those columns in which the severity is fairly high; for instance, in columns in which the severity has a numerical value in excess of 3. However in columns in which the severity numerical value is lower or in columns in which very large changes of feed composition occur, the modification of the feed enthalpy will affect the severity in the column to the point where it will also affect the composition of the overhead product. Under these circumstances, it is not possible to fully compensate on a transient basis for the changes in feed composition. However, it is possible to compensate for the effect of changes of feed composition on either the distillate or the bottom product. For instance, if it is desired to maintain the distillate with a minimum of transient errors, it is possible for the computer to change the enthalpy of the feed and the total quantity of the feed such that the vapor rate in the rectifying section is maintained constant.

Such a system as in FIGURE V, may use feed forward control (system 45) operated, at a value determined by the computer, through control line 46.

Such a system, while maintaining a fixed vapor rate in the rectifying section, causes a transient disturbance in the stripping section which is larger than would have occurred had the feed been maintained at a constant value. This will, of course, cause transient errors in the bottom composition which are larger than would have occurred had the feed quantity been maintained constant. However, when the composition of the overhead product is critical, this may be advantageous.

When the composition of the feed material goes through a fairly rapid change of composition and then maintains a reasonably constant value over a long period of time, the change of feed rate by the control system just outlined, may be inconsistent with economical operation of the column. In such cases, it would be desirable to return the rate of feed to its original value and to readjust the reflux and reboiler rates in such a way as to maintain the column within allowable specifications of top and bottom product composition during the transient change.

In such cases the feed controller 45 would permit a gradual readjustment of the value of the feed quantity and at the same time, would modify the reflux quantity through flow control system 26 being controlled from the computer by control lines 48′ and the feed of heating material to the reboiler through flow control system 47 being controlled by the computer through control line 49′.

The rate at which these changes can be made must be consistent with the allowable changes in the column and might, for instance, be modified at a rate not exceeding 3% per hour.

It is intended that of the system of FIGURE V various parts may be used in various sub-combinations. For example, in some cases the reflux and reboiler factors just mentioned would not be used, and in some cases there may be simply a use of the reflux and not of the reboiler. Thus for example, a system such as that shown in FIGURE I plus an analysis of reflux and application of such a signal to the computer to take a part in the overall compensating signals might be accomplished by a sub-combination of the features shown in FIGURE V.

In the compensation action according to this invention it is usual to apply close correction either to the upper, rectifying portion of the column or through the lower, stripping portion of the column, these being defined as above and below the feed tray. One such condition may be held very closely, for example the top product situation; and the transient activity of the column in case of a feed composition upset, whereas the stripping section of the column or the bottom product would necessarily act according to whatever the situation demanded. Thus within the ordinary operating limits of possible departure the bottom product may have to vary in an instance where the top product is the situation of the closest control. This may also be the reverse. This situation applies and exists throughout this entire inventive concept with respect to the various combinations discussed and disclosed herein.

In order to evaluate the advantages obtained from this invention, a computation was carried forward on a particular column. It was assumed that the column was operating under steady-state conditions with the following parameters:

(1) Feed—50% ethylene, 50% ethane.
(2) Feed tray—27th tray.
(3) Number of trays—40 theoretical plates, plus overhead condenser.
(4) Initial feed enthalpy—equal to that required to obtain 50% vapor and 50% liquid at column operating conditions.
(5) Column pressure—285 p.s.i.g.

A column profile for such operating conditions was computed using the Bonner Program on an IBM-650 Digital Computer. The theoretical profile developed for the above conditions may be referred to as the computed reference profile.

Computations were then made on the column under other operating conditions and the results of these other operating conditions as related to the computed reference profile were compared. This comparison is shown in FIGURE VI. The first of the other operating conditions which was computed was that of a column operating in an identical manner as that represented by the computed reference profile, with the exception that the composition of the feed was changed so that it contained 55% ethylene and 45% ethane. The difference between the profile thus obtained and the computed reference profile is shown on the curve marked "no control." This is the profile difference which would have developed in an actual operating column had the composition of the feed material been changed and had no other change been made in the column operation.

The next computation made was again based on the exact conditions of derivation of the computed reference profile, with two exceptions: first, the feed was changed to 55% ethylene and 45% ethane and second, the reflux rate was modified in order to obtain a desired distillate yield to obtain the same overhead composition as had been obtained previously. The difference between this profile and the computed reference profile is shown on the curve marked "prior art control, terminal deviation."

The maximum change occurring during the prior art control transient conditions in the column due to a changed feed composition falls somewhere between the steady-state conditions of "no control" and the conditions of "terminal deviation" under "prior art conditions" as shown in the curve. The dotted line marked "maximum transient deviation" is an approximation of what would occur as the maximum deviation on each tray during a prior art control transient change following a change of feed composition.

The next computation was based directly on the present invention and was run on conditions exactly the same as those existing in the computed reference profile with the following exceptions:

(1) The composition of the feed was changed to 55% ethylene and 45% ethane.
(2) The enthalpy of the feed was changed to develop an optimum distillate yield in the overhead of the column.

As has been pointed out, the changes of composition on a particular tray which occur due to the changes of feed composition, can only occur by the transportation of material from the feed tray by means of vapor rising in the rectifying section or by means of the liquid dropping in the stripping section of the column. These transient deviations on a particular tray are functions both of the composition and quantity of the vapor in the rectifying section and the composition of the liquid and the quantity of the liquid in the stripping sections. Since, under enthalpy control as described in this invention, the change of rate of vapor and of composition of vapor are taken simultaneously for the rectifying section, and changes of liquid rate and liquid composition are taken simultaneously for the stripping section, the maximum transient change which occurs on any plate will closely approximate the steady-state change to occur on that same plate. Therefore, the curve marked "Enthalpy Control" in FIGURE VI closely approximates the maxium deviation which occurs under transient conditions as well as representing exactly the deviation which will occur under steady-state conditions.

The following are advantages of enthalpy-feed modification as a means of controlling the column during changes of feed composition:

(1) The maximum transient deviation under "enthalpy control" is substantially less than the maximum transient deviation during a change of feed composition with the column under reflux control.
(2) The maximum deviation under steady-state conditions when enthalpy control is used, is substantially less than the terminal deviation which occurs under steady-state conditions with reflux control.
(3) The variations in the composition of the bottom product with a fixed distillate composition is less with enthalpy control than with the reflux control system.

It should be noted that, although the discussion generally refers to control of distillate yield, by controlling vapor in the rectifying section of the column by controlling feed enthalpy, the principles involved are equally applicable to the control of bottom composition by controlling bottom yield by controlling liquid in the stripping section of the column by controlling feed enthalpy.

In further discussion of column operation:

Extension studies of the dynamics of fractionation columns have been developed. Most of these studies have been based either on actual columns under extremely small perturbations or on computations which have been developed from linearized and simplified equations. For this reason, the actual dynamic response of a column to the various possible changes which may be made in it by the control system in actual practice, has not been developed into much meaningful data.

A rigorous description of the dynamic response of a binary bubble-plate column will require solutions in the order of 120 non-linear partial differential equations in simultaneous form.

Despite the rather limited available knowledge of the dynamics of a column, there are certain areas in which there seems to be little doubt as to the operation of the variables.

It is believed to be clear that the dynamics of a fractionating column are characterized by a group of substantial dead times and substantial RC delays both as regards the change of composition on a particular tray, and, more importantly, as regards the effect of changes of composition and vapor liquid ratio in one tray in respect to changes in composition and vapor liquid ratio in other trays of the column. The conventional control system may be evaluated in this light.

In conventional systems, based on feed back control, the change of feed composition enters the column at the feed tray and proceeds upward and downward in the column changing the composition on the various trays at a rate which is a function of the feed-to-liquid rate in the column, and a function of the tray holdup to liquid rate in the column. The conventional control system takes no control action during the dead time involved in the transfer of material from the feed tray to the analysis tray. Due to the R-C delays, the conventional controller takes only limited action for a considerable further period, until the change in feed composition has had a material effect on the composition on the analysis tray. Derivative action as incorporated in conventional controllers compensates only to a limited degree for this delay which results from the serial effect of the R-C delays from tray to tray.

When such a change is felt, the conventional controller will begin to modify the liquid reflux to the column in order to correct for the change of feed composition. However, the results of such a modification are not felt until the change of reflux at the top of the column has passed down through the column and the appropriate dead time has expired. Thus there is a corresponding serial R-C delay and equivalent effective dead time in the effect of change of liquid reflux rate to the column. Thus with the conventional control system, two substantial serial R-C delay systems with their equivalent effective dead times are involved between changes of feed composition and the resultant effects on column profile.

This invention provides a feed forward compensation which operates with negligible dead time and delay from a measurement of change of feed composition to provide compensation for this change immediately and without dead time or R-C delay.

This can be used as a separate function or may be combined with a conventional feedback control system which will correct for second order variations which may occur in spite of the feed forward compensation action. With this combination, the location of the analysis tray can be chosen at an optimum point for most accurate measurement. As previously mentioned, when feed back control alone is used, the location of the analysis tray is influenced both by dynamic considerations tending to locate this tray well down the column toward feed point and by static considerations relating to accuracy of measurement tending to locate the tray near the top of the column. The practice of this invention which to a large extent compensates for the dynamics involved in changes of feed composition permits the selection of the location of the analysis tray near the top of the column, thereby providing optimum static quality control, together with the improved dynamic control provided by the changes in the introduction of the feed with changes in feed composition.

The above description is of course based on a column where the composition of the overhead product is the primary consideration. In the columns where the composition of the bottom product is the primary consideration, the same reasoning would hold except that an analysis near the bottom of the column would be used as a basis of the feedback control operating into the heat input to the reboiler.

This invention, therefore, provides a new and useful fractionation control system where feed composition upsets are compensated for by corrective action at least with respect to the feed to the column.

As many embodiments may be made of the above invention, and as changes may be made in the embodiments set forth above without departing from the scope of the invention, it is to be understood that all matter hereinbefore set forth or shown in the accompanyiny drawings is to be interpreted as illustrative only and not in a limiting sense.

I claim:

1. Apparatus for fractionating a feed stock containing variable amounts of at least two components to produce corresponding separated products the purity of at least one of which is to be maintained substantially constant; said apparatus comprising, in combination, a distillation column, a supply conduit connected to the input of said column to convey thereto the feed stock to be separated, composition analyzing means operable with the feed stock in said conduit to measure the amount of at least one of said components in said feed stock, said composition analyzing means including means to produce an output signal corresponding to the measured amount of said one component, a computer connected to said composition analyzing means to receive said output signal, said computer including means to store a program based on the characteristics of said distillation column under different conditions of operation and relating the output purity of said one product to the enthalpy per unit of mass of said feed stock for various feed stock compositions, said computer also including means responsive to said output signal and operative with said means to store a program to produce for the measured amount of said one component a signal representative of the corresponding proper value of feed stock enthalpy per unit of mass which will tend to maintain the desired purity of said one product, enthalpy control means connected to said conduit to provide an operative association with said feed stock, said enthalpy control means including adjustable means for controllably altering the heat energy content of said feed stock to vary the enthalpy thereof, said enthalpy control means also including means to produce a signal representative of the actual enthalpy per unit of mass of the feed stock entering said column, said enthalpy control means further including means operable with said computer to produce and direct to said adjustable means a control signal reflecting the difference between said signal representative of the actual valve of feed stock enthalpy per unit of mass and said signal representative of the proper value of feed stock enthalpy per unit of mass as determined by said computer, said adjustable means being operative in response to said control signal to alter the feed stock enthalpy as required to minimize the difference between said actual value and said computed proper value of feed stock enthalpy per unit of mass.

2. Apparatus as claimed in claim 1, wherein said means to produce a signal representative of the actual enthalpy per unit of mass of the feed stock comprises temperature measuring means connected to said conduit downstream of said adjustable means to produce a measurement signal indicative of the temperature of said feed stock.

3. Apparatus as claimed in claim 1, wherein said feed stock is partly vapor and partly liquid so that the enthalpy per unit of mass thereof is determinable by the pressure and temperature for a given feed stock composition, said enthalpy control apparatus including means for sensing both the pressure and temperature of said feed stock downstream of said adjustable means and for transmitting to said computer corresponding measurement signals to facilitate the development of said signal representative of the actual feed stock enthalpy per unit of mass.

4. Apparatus as claimed in claim 1, wherein said distillation column comprises a plurality of trays over which the material to be fractionated passes, second composition analyzing means to determine the composition of the material passing over the individual trays of a particular group of said trays and to transmit to said computer signals representing the results of such determination, and valve means for directing said feed stock at least predominantly to any selected one of said groups of trays, said computer being responsive to the signals produced by said second composition analyzing means and operative to control said valve means to direct said feed stock to the one of said trays where the material composition corresponds to the composition of said feed stock.

5. Apparatus as claimed in claim 1, wherein said adjustable means comprises a heater unit in heat-exchange relationship with said feed stock within said supply conduit.

6. Apparatus as claimed in claim 1, including second composition analyzing means for measuring the purity of said one product produced by said distillation column and for directing to said computer a corresponding signal indicating the results of such measurement, said computer including means operative in response to changes in said corresponding signal to effect a variation in said control signal directed to said adjustable means so as to alter said feed stock enthalpy to tend to minimize changes in the measured purity of said one product.

7. Apparatus as claimed in claim 1, including reflux means to return a portion of said one product to said distillation column, flow control means for setting the flow rate of the returned portion of said one product, second composition analyzing means for measuring the composition of said one product produced by said distillation column and for directing a corresponding signal to said computer, said computer including means operative in response to changes in said corresponding signal to adjust said flow control means so as to tend to maintain the desired condition of purity of said one product.

8. Apparatus as claimed in claim 1, including means to adjust the flow rate of said feed stock, and means under the control of said computer for directing to said flow rate adjusting means a control signal effective to set the flow rate of said feed stock at a desired value as determined by said computer in conjunction with the determination of said proper value of enthalpy per unit of mass.

References Cited in the file of this patent

UNITED STATES PATENTS

| | | |
|---|---|---|
| 2,419,528 | Biegel | Apr. 29, 1947 |
| 2,547,970 | Phillips et al. | Apr. 10, 1951 |
| 2,754,053 | Howe et al. | July 10, 1956 |
| 2,900,312 | Gilmore | Aug. 18, 1959 |
| 2,933,900 | Hanthorn | Apr. 26, 1960 |
| 2,977,289 | Kron | Mar. 28, 1961 |
| 2,990,437 | Berger | June 27, 1961 |
| 3,009,864 | Webb | Nov. 21, 1961 |
| 3,018,230 | Morgan | Jan. 23, 1962 |
| 3,021,263 | Berger et al. | Feb. 13, 1962 |
| 3,034,718 | Freitas et al. | May 15, 1962 |

FOREIGN PATENTS

| | | |
|---|---|---|
| 1,177,743 | France | Apr. 29, 1959 |

OTHER REFERENCES

"Instruments & Process Control," N.Y. State Vocational and Practical Arts Assn., 1945, pp. 155–185.

"Automatic Control," May 1958, vol. 7–8, pp. 45–48.

"Automatic Control," May 1958, vol. 7–8, pp. 43–48.